(12) United States Patent
Dapp et al.

(10) Patent No.: US 7,146,643 B2
(45) Date of Patent: Dec. 5, 2006

(54) INTRUSION DETECTION ACCELERATOR

(75) Inventors: Michael C. Dapp, Endwell, NY (US); Eric C. Lett, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 117 days.

(21) Appl. No.: 10/331,879

(22) Filed: Dec. 31, 2002

(65) Prior Publication Data

US 2004/0083387 A1    Apr. 29, 2004

Related U.S. Application Data

(60) Provisional application No. 60/421,773, filed on Oct. 29, 2002, provisional application No. 60/421,774, filed on Oct. 29, 2002, provisional application No. 60/421,775, filed on Oct. 29, 2002.

(51) Int. Cl.
*G06F 11/22* (2006.01)

(52) U.S. Cl. .............................. 726/23; 726/24; 726/25; 713/164; 713/188

(58) Field of Classification Search ........ 713/200–201, 713/188, 164; 714/819; 726/23–25
See application file for complete search history.

(56) References Cited

U.S. PATENT DOCUMENTS

| | | | |
|---|---|---|---|
| 4,279,034 A | 7/1981 | Baxter | |
| 4,527,270 A | 7/1985 | Sweeton | |
| 4,556,972 A | 12/1985 | Chan et al. | |
| 4,622,546 A | 11/1986 | Sfarti et al. | |
| 4,879,716 A | 11/1989 | McNally et al. | |
| 5,003,531 A | 3/1991 | Farinholt et al. | |
| 5,027,342 A | 6/1991 | Boulton et al. | |
| 5,193,192 A | 3/1993 | Seberger | |
| 5,214,778 A | 5/1993 | Glider et al. | |
| 5,247,664 A | 9/1993 | Thompson et al. | |
| 5,280,577 A | 1/1994 | Trevett et al. | |
| 5,319,776 A * | 6/1994 | Hile et al. ................... 713/200 |
| 5,379,289 A | 1/1995 | DeSouza et al. | |
| 5,414,833 A | 5/1995 | Hershey et al. | |
| 5,511,213 A | 4/1996 | Correa | |
| 5,513,345 A | 4/1996 | Sato et al. | |
| 5,600,784 A | 2/1997 | Bissett et al. | |
| 5,606,668 A | 2/1997 | Shwed | |
| 5,621,889 A | 4/1997 | Lermuzeaux et al. | |

(Continued)

FOREIGN PATENT DOCUMENTS

| | | |
|---|---|---|
| CA | 2307529 A1 | 9/2001 |
| WO | WO02/11399 A1 | 2/2002 |
| WO | WO 02/095543 A2 | 11/2002 |

OTHER PUBLICATIONS

Lunteren et al., "XML Accelerator Engine", 2004.*
Sakharov, "Finite State Machine Specification and Generation in Java", 2000, http://sakharov.net/fsm.html.*

(Continued)

*Primary Examiner*—Jacques Louis-Jacques
*Assistant Examiner*—Tongoc Tran
(74) *Attorney, Agent, or Firm*—Miles & Stockbridge PC; James T. Carmichael

(57) ABSTRACT

Signatures of character strings in a document which may indicate a possible intrusion into or attack on a networked computer system or node thereof or other security breach are detected at high speed using a hardware accelerator within the environment of a hardware parser accelerator. An interrupt or exception can thus be issued to a host CPU before a command which may constitute such a security breach, intrusion or attack can be made executable by parsing of a document. The CPU can initiate network control measures to prevent or limit the intrusion.

25 Claims, 9 Drawing Sheets

U.S. PATENT DOCUMENTS

| | | |
|---|---|---|
| 5,649,215 A | 7/1997 | Itoh |
| 5,655,068 A | 8/1997 | Opoczynski |
| 5,666,479 A | 9/1997 | Kashimoto et al. |
| 5,684,957 A | 11/1997 | Kondo et al. |
| 5,696,486 A | 12/1997 | Poliquin et al. |
| 5,737,526 A | 4/1998 | Periasamy et al. |
| 5,742,771 A | 4/1998 | Fontaine |
| 5,798,706 A | 8/1998 | Kraemer et al. |
| 5,805,801 A | 9/1998 | Holloway et al. |
| 5,815,647 A | 9/1998 | Buckland et al. |
| 5,832,227 A | 11/1998 | Anderson et al. |
| 5,848,410 A | 12/1998 | Walls et al. |
| 5,850,515 A | 12/1998 | Lo et al. |
| 5,905,859 A | 5/1999 | Holloway et al. |
| 5,919,257 A | 7/1999 | Trostle |
| 5,919,258 A | 7/1999 | Kayashima et al. |
| 5,920,698 A | 7/1999 | Ben-Michael et al. |
| 5,922,049 A | 7/1999 | Radia et al. |
| 5,958,015 A | 9/1999 | Dascalu |
| 5,969,632 A | 10/1999 | Diamant et al. |
| 5,982,890 A | 11/1999 | Akatsu |
| 5,991,881 A | 11/1999 | Conklin et al. |
| 5,995,963 A | 11/1999 | Nanba et al. |
| 6,000,045 A | 12/1999 | Lewis |
| 6,006,019 A | 12/1999 | Takei |
| 6,021,510 A * | 2/2000 | Nachenberg .................. 714/38 |
| 6,083,276 A | 7/2000 | Davidson et al. |
| 6,094,731 A * | 7/2000 | Waldin et al. ................. 714/38 |
| 6,119,236 A | 9/2000 | Shipley |
| 6,151,624 A | 11/2000 | Teare et al. |
| 6,167,448 A | 12/2000 | Hemphill et al. |
| 6,173,333 B1 | 1/2001 | Jolitz et al. |
| 6,182,029 B1 | 1/2001 | Friedman |
| 6,233,704 B1 | 5/2001 | Scott et al. |
| 6,279,113 B1 | 8/2001 | Vaidya |
| 6,282,546 B1 | 8/2001 | Gleichauf et al. |
| 6,295,276 B1 | 9/2001 | Datta et al. |
| 6,301,668 B1 | 10/2001 | Gleichauf et al. |
| 6,304,973 B1 | 10/2001 | Williams |
| 6,321,338 B1 | 11/2001 | Porras et al. |
| 6,363,489 B1 | 3/2002 | Comay et al. |
| 6,366,934 B1 | 4/2002 | Cheng et al. |
| 6,370,648 B1 | 4/2002 | Diep |
| 6,374,207 B1 | 4/2002 | Li et al. |
| 6,393,386 B1 | 5/2002 | Zager et al. |
| 6,405,318 B1 | 6/2002 | Rowland |
| 6,408,311 B1 | 6/2002 | Baisley et al. |
| 6,418,446 B1 | 7/2002 | Lection et al. |
| 6,421,656 B1 | 7/2002 | Cheng et al. |
| 6,446,110 B1 | 9/2002 | Lection et al. |
| 6,684,335 B1 | 1/2004 | Epstein et al. |
| 6,697,950 B1 * | 2/2004 | Ko ............................. 713/201 |
| 6,792,546 B1 * | 9/2004 | Shanklin et al. ............ 713/201 |
| 6,862,588 B1 * | 3/2005 | Beged-Dov et al. ........... 707/3 |
| 2001/0056504 A1 | 12/2001 | Kuznetsov |
| 2002/0010715 A1 | 1/2002 | Chinn et al. |
| 2002/0013710 A1 | 1/2002 | Shimakawa |
| 2002/0035619 A1 | 3/2002 | Dougherty et al. |
| 2002/0038320 A1 | 3/2002 | Brook |
| 2002/0059528 A1 | 5/2002 | Dapp |
| 2002/0066035 A1 | 5/2002 | Dapp |
| 2002/0069318 A1 | 6/2002 | Chow et al. |
| 2002/0073091 A1 | 6/2002 | Jain et al. |
| 2002/0073119 A1 | 6/2002 | Richard |
| 2002/0082886 A1 | 6/2002 | Manganaris et al. |
| 2002/0083343 A1 | 6/2002 | Crosbie et al. |
| 2002/0087882 A1 | 7/2002 | Schneier et al. |
| 2002/0091999 A1 | 7/2002 | Guinart |
| 2002/0099710 A1 | 7/2002 | Papierniak |
| 2002/0099715 A1 | 7/2002 | Jahnke et al |
| 2002/0099734 A1 | 7/2002 | Yassin et al. |
| 2002/0103829 A1 | 8/2002 | Manning et al. |
| 2002/0108059 A1 | 8/2002 | Canion et al. |
| 2002/0111963 A1 | 8/2002 | Gebert et al. |
| 2002/0111965 A1 | 8/2002 | Kutter |
| 2002/0112224 A1 | 8/2002 | Cox |
| 2002/0116550 A1 | 8/2002 | Hansen |
| 2002/0116585 A1 | 8/2002 | Scherr |
| 2002/0116644 A1 | 8/2002 | Richard |
| 2002/0120697 A1 | 8/2002 | Generous et al. |
| 2002/0122054 A1 | 9/2002 | Hind et al. |
| 2002/0133484 A1 | 9/2002 | Chau et al. |
| 2002/0143819 A1 | 10/2002 | Han et al. |
| 2002/0152244 A1 | 10/2002 | Dean et al. |
| 2002/0156772 A1 | 10/2002 | Chau et al. |
| 2002/0165872 A1 | 11/2002 | Meltzer et al. |
| 2003/0041302 A1 * | 2/2003 | McDonald .................. 715/513 |
| 2003/0229846 A1 * | 12/2003 | Sethi et al. .................. 715/500 |
| 2004/0025118 A1 | 2/2004 | Renner |
| 2004/0073870 A1 | 4/2004 | Fuh et al. |
| 2004/0083221 A1 | 4/2004 | Dapp et al. |
| 2004/0083387 A1 | 4/2004 | Dapp et al. |
| 2004/0083466 A1 | 4/2004 | Dapp et al. |
| 2004/0172234 A1 | 9/2004 | Dapp et al. |
| 2004/0194016 A1 | 9/2004 | Liggitt |
| 2005/0039124 A1 | 2/2005 | Chu et al. |
| 2005/0177543 A1 | 8/2005 | Chen et al. |

OTHER PUBLICATIONS

A.B. Kulkarni, S.F. Bush and S.C. Evans "Detecting Distributed Denial-of-Service Attacks Using Kolmogorov Complexes Metrics" dated Dec. 2001.

S.C. Evans and S.F. Bush "Symbol Compression Ratio for String Compression and Estimation of Kolmogorov Complexity" dated Nov. 2001.

M. Neumann; "Encryption Black Box (SiNic)"; ESNET Steering Committee Meeting, Sep. 11-13, 2001.

E. Zadok; "Stackable File Systems as a Security Tool"; Technical Report CUCS-036-99 Columbia University Computer Science Department; Dec. 1999; pp. 1-19.

Kent, RFC 2401, "Security Architecture for the Internet Protocol," 1998.

Fraser et al., "Hardening COTs Software with Generic Software Wrappers"; DARPA Information Survivability Conference and Exposition, 2000, pp. 323-337.

Pal et al., "Open Implementation Toolkit for Building Survivable Applications", DARPA Information Survivability Conference and Exposition, 2000, pp. 197-210.

Andrivet et al., "A Simple XML Parser", Jul. 1999, C/C++ Users Journal, R&D Publications, Lawrence, KS, US, pp. 22,24,26-28,30,32, XP008015172, ISSN: 1075-2838.

Cooper, C., "Using Expat", Sep. 1, 1999, XP002177815.

B. Trippe; "XML Hits the Big Time: Major Database Players get into XML"; Find articles.com; Sep. 2002; pp. 1-9.

Business Wire, Bellevue, Wash; "DataChannel Releases the Most Advanced XML Parser—XJParser—and Introduces xDev its XML Developers Program"; Find articles.com; Apr. 16, 1999, pp. 1-9.

InfoWorld: "Extensible Markup Language (XM). (Technology Information)"; Find articles.com; Jun. 1998; pp. 1-6.

T. Yager, "New Standards Orbit (XML) (Technology Information)"; Find articles.com; Jun. 2000; pp. 1-9.

Microsoft Corp., "XML: Enabling Next-Generation Web Applications"; Dytech Solutions; Apr. 1998; pp. 1-15.

Aho, A.V. et al., "Principles of Compiler Design", Principles of Compiler Design, Reading, Addison-Wesley Publishing Co., US., 1979, pp. 73-125, XP002140006, p. 88, line 4—p. 115, line 7; figures 3.5-3.22.

Bauer, F.L., "Compiler Construction—An Advanced Course", 1976, Spring-Verlag, Germany, XP002312623, pp. 42-55; pp. 85-108.

* cited by examiner

| Base Address | Index → | ASCII Value | | | | | | | |
|---|---|---|---|---|---|---|---|---|---|
| | | 00 | 01 | 02 | 03 | ... | FD | FE | FF |
| State 0 | | Stay in State 0 | Stay in State 0 | Go To State 1 | Stay in State 0 | ----- | Stay in State 0, Special Interrupt | Stay in State 0 | Stay in State 0 |
| State 1 | | Stay in State 1 | Go To State 2 | Go To State 0 | Stay in State 1 | ----- | Go To State 4 | Go To State 0 | Go To State 0 |
| State 2 | | Stay in State 2 | Go To State 3 | Go To State 0 | Go To State 3, Special Interrupt | ----- | Go To State 0 | Go To State 0 | Go To State 0 |
| State 3 | | Stay in State 3 | Go To State 0 | Go To State 0, Store Token | Go To State 0 | ----- | Go To State 0 | Go To State 0 | Go To State 0 |
| State 4 | | Stay in State 4 | Go To State 0, Store Token | Go To State 0 | Go To State 0 | ----- | Go To State 0 | Go To State 5 | Go To State 0 |
| State 5 | | Stay in State 5 | Go To State 0 | Go To State 0 | Go To State 0 | ----- | Go To State 0 | Go To State 0 | Go To State 0, Store Token |

*Figure 1*

INTRUSION DETECTION ACCELERATOR

CROSS-REFERENCE TO RELATED APPLICATIONS

This application claims benefit of priority of U.S. Provisional Patent Application Ser. No. 60/421,773, filed Oct. 29, 2002, the entire contents of which are hereby fully incorporated by reference. Further, this application is related to U.S. patent applications Ser. No. 10/334,086, published as U.S. Patent Application Publication No. 2004/0083466 A1 and U.S. patent application Ser. No. 10/331,315, published as U.S. Patent Application Publication No. 2004/0083221 A1, corresponding to U.S. Provisional Patent applications 60/421,774 and 60/421,775, respectively) which are assigned to the assignee of this invention and also fully incorporated by reference herein.

BACKGROUND OF THE INVENTION

1. Field of the Invention

The present invention generally relates to parsing of documents such as an XML™ document and, more particularly to parsing a document or other logical sequence of network data packets for detecting potential intrusion or an attack on a node of a network.

2. Description of the Prior Art

The field of digital communications between computers and the linking of computers into networks has developed rapidly in recent years, similar, in many ways to the proliferation of personal computers of a few years earlier. This increase in interconnectivity and the possibility of remote processing has greatly increased the effective capability and functionality of individual computers in such networked systems. Nevertheless, the variety of uses of individual computers and systems, preferences of their users and the state of the art when computers are placed into service has resulted in a substantial degree of variety of capabilities and configurations of individual machines and their operating systems, collectively referred to as "platforms" which are generally incompatible with each other to some degree particularly at the level of operating system and programming language.

This incompatibility of platform characteristics and the simultaneous requirement for the capability of communication and remote processing and a sufficient degree of compatibility to support it has resulted in the development of object oriented programming (which accommodates the concept of assembling an application as well as data as a group of more or less generalized modules through a referencing system of entities, attributes and relationships) and a number of programming languages to embody it. Extensible Markup Language™ (XML™) is such a language which has come into widespread use and can be transmitted as a document over a network of arbitrary construction and architecture.

In such a language, certain character strings correspond to certain commands or identifications, including special characters and other important data (collectively referred to as control words) which allow data or operations to, in effect, identify themselves so that they may be, thereafter treated as "objects" such that associated data and commands can be translated into the appropriate formats and commands of different applications in different languages in order to engender a degree of compatibility of respective connected platforms sufficient to support the desired processing at a given machine. The detection of these character strings is performed by an operation known as parsing, similar to the more conventional usage of resolving the syntax of an expression, such as a sentence, into its component parts and describing them grammatically.

When parsing an XML™ document, a large portion and possibly a majority of the central processor unit (CPU) execution time is spent traversing the document searching for control words, special characters and other important data as defined for the particular XML™ standard being processed. This is typically done by software which queries each character and determines if it belongs to the predefined set of strings of interest, for example, a set of character strings comprising the following "<command>", "<data=dataword>", "<endcommand>", etc. If any of the target strings are detected, a token is saved with a pointer to the location in the document for the start of the token and the length of the token. These tokens are accumulated until the entire document has been parsed.

The conventional approach is to implement a table-based finite state machine (FSM) to search for these strings of interest. The state table resides in memory and is designed to search for the specific patterns in the document. The current state is used as the base address into the state table and the ASCII representation of the input character is an index into the table. For example, assume the state machine is in state 0 (zero) and the first input character is ASCII value 02, the absolute address for the state entry would be the sum/concatenation of the base address (state 0) and the index/ASCII character (02). The FSM begins with the CPU fetching the first character of the input document from memory. The CPU then constructs the absolute address in the state table in memory corresponding to the initialized/current state and the input character and then fetches the state data from the state table. Based on the state data that is returned, the CPU updates the current state to the new value, if different (indicating that the character corresponds to the first character of a string of interest) and performs any other action indicated in the state data (e.g. issuing a token or an interrupt if the single character is a special character or if the current character is found, upon a further repetition of the foregoing, to be the last character of a string of interest).

The above process is repeated and the state is changed as successive characters of a string of interest are found. That is, if the initial character is of interest as being the initial character of a string of interest, the state of the FSM can be advanced to a new state (e.g. from initial state 0 to state 1). If the character is not of interest, the state machine would (generally) remain the same by specifying the same state (e.g. state 0) or not commanding a state update) in the state table entry that is returned from the state table address. Possible actions include, but are not limited to, setting interrupts, storing tokens and updating pointers. The process is then repeated with the following character. It should be noted that while a string of interest is being followed and the FSM is in a state other than state 0 (or other state indicating that a string of interest has not yet been found of currently being followed) a character may be found which is not consistent with a current string but is an initial character of another string of interest. In such a case, state table entries would indicate appropriate action to indicate and identify the string fragment or portion previously being followed and to follow the possible new string of interest until the new string is completely identified or found not to be a string of interest. In other words, strings of interest may be nested and the state machine must be able to detect a string of interest within another string of interest, and so on. This may require the CPU to traverse portions of the XML™ document numerous times to completely parse the XML™ document.

The entire XML™ or other language document is parsed character-by-character in the above-described manner. As potential target strings are recognized, the FSM steps through various state character-by-character until a string of interest is fully identified or a character inconsistent with a possible string of interest is encountered (e.g. when the string is completed/fully matched or a character deviates from a target string). In the latter case, no action is generally taken other than returning to the initial state or a state corresponding to the detection of an initial character of another target string. In the former case, the token is stored into memory along with the starting address in the input document and the length of the token. When the parsing is completed, all objects will have been identified and processing in accordance with the local or given platform can be started.

Since the search is generally conducted for multiple strings of interest, the state table can provide multiple transitions from any given state. This approach allows the current character to be analyzed for multiple target strings at the same time while conveniently accommodating nested strings.

It can be seen from the foregoing that the parsing of a document such as an XML™ document requires many repetitions and many memory accesses for each repetition. Therefore, processing time on a general purpose CPU is necessarily substantial. A further major complexity of handling the multiple strings lies in the generation of the large state tables and is handled off-line from the real-time packet processing. However, this requires a large number of CPU cycles to fetch the input character data, fetch the state data and update the various pointers and state addresses for each character in the document. Thus, it is relatively common for the parsing of a document such as an XML™ document to fully pre-empt other processing on the CPU or platform and to substantially delay the processing requested.

It has been recognized in the art that, through programming, general-purpose hardware can be made to emulate the function of special purpose hardware and that special purpose data processing hardware will often function more rapidly than programmed general purpose hardware even if the structure and program precisely correspond to each other since there is less overhead involved in managing and controlling special purpose hardware. Nevertheless, the hardware resources required for certain processing may be prohibitively large for special purpose hardware, particularly where the processing speed gain may be marginal. Further, special purpose hardware necessarily has functional limitations and providing sufficient flexibility for certain applications such as providing the capability of searching for an arbitrary number of arbitrary combinations of characters may also be prohibitive. Thus, to be feasible, special purpose hardware must provide a large gain in processing speed while providing very substantial hardware economy; requirements which are increasingly difficult to accommodate simultaneously as increasing amounts of functional flexibility or programmability are needed in the processing function required.

In this regard, the issue of system security is also raised by both interconnectability and the amount of processing time required for parsing a document such as an XML™ document. On the one hand, any process which requires an extreme amount of processing time at relatively high priority is, in some ways, similar to some characteristics of a denial-of-service (DOS) attack on the system or a node thereof or can be a tool that can be used in such an attack.

DOS attacks frequently present frivolous or malformed requests for service to a system for the purpose of maliciously consuming and eventually overloading available resources. Proper configuration of hardware accelerators can greatly reduce or eliminate the potential to overload available resources. In addition, systems often fail or expose security weaknesses when overloaded. Thus, eliminating overloads is an important security consideration.

Further, it is possible for some processing to begin and some commands to be executed before parsing is completed since the state table must be able to contain CPU commands at basic levels which are difficult or impossible to secure without severe compromise of system performance. In short, the potential for compromise of security would be necessarily reduced by reduction of processing time for processes such as XML™ parsing but no technique for significantly reducing the processing time for such parsing has been available.

Many security systems rely on the ability to detect an attempted security breach at a very early stage and a security breach may be difficult or impossible to interrupt quickly or through programmed intervention, once begun. For example, a highly secure system has been proposed and is disclosed in U.S. patent applications Ser. Nos. 09/973,769 and 09/973,776, both assigned to the assignee of the present application. These applications disclose a system having two levels of internodal communications, one at very high speed, by which a node at which a possible attack or intrusion is detected can be compartmentalized and then automatically repaired, if necessary, before reconnection to the network. Acceleration of parsing therefore supports early response to a potential attack and is particularly advantageous in a system such as that disclosed in the system described in the above-incorporated patent applications since an appropriate control of the network can be initiated as an incident of parsing and can thus be initiated at an earlier time if parsing can be significantly accelerated. Proper network control, initiated in a timely fashion in response to a detection alert can effect intrusion prevention in addition to intrusion detection.

SUMMARY OF THE INVENTION

The present invention provides a hardware parser accelerator which provides extreme acceleration of parsing of documents for detection of signatures of a possible intrusion, attack or other security breach in a networked computer system at speeds which accommodate network transmission packet speeds for potentially real-time intrusion detection and prevention actions.

In order to accomplish this and other objects of the invention, an intrusion detection system, possibly implemented within a document parser is provided, comprising a character buffer for a plurality of bytes of a document, a state table addressable in accordance with a byte of a document and a state to access at least one of an interrupt or exception and next state data from the state table, a register for storing next state data, an adder for combining contents of the register with a subsequent byte of a document to form a further address into the state memory, and a bus for communicating the interrupt or exception to a host CPU.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a representation of a portion of a state table used in parsing a document.

DETAILED DESCRIPTION OF A PREFERRED EMBODIMENT OF THE INVENTION

Figure 2A:
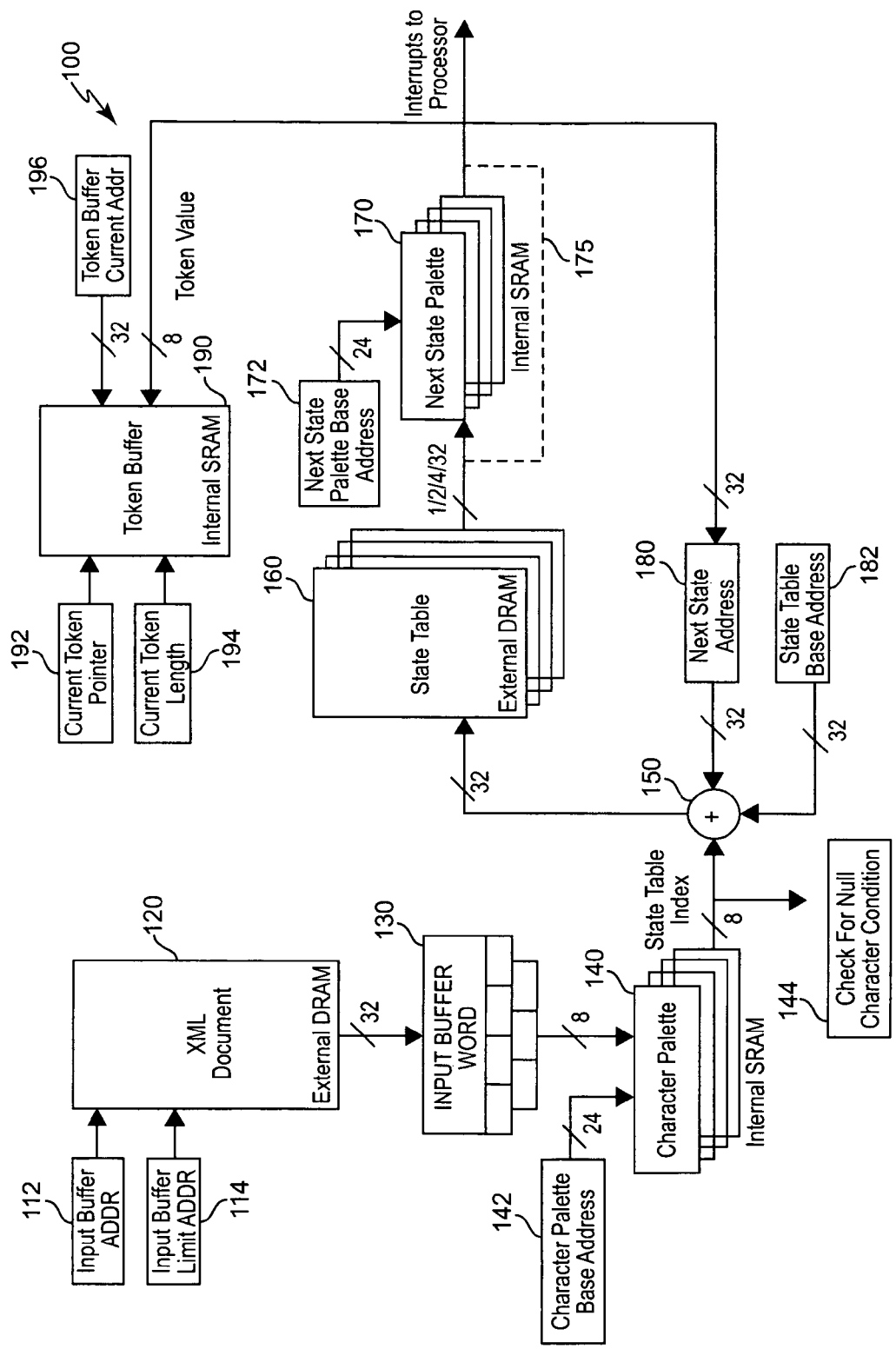
FIG. 2A is a high level schematic diagram of the parser accelerator in accordance with a concurrently filed related provisional patent application.

Referring now to the drawings, and more particularly to FIG. 1, there is shown a representation of a portion of a state table useful in understanding the invention. It should be understood that the state table shown in FIG. 1 is potentially only a very small portion of a state table useful for parsing an XML™ document and is intended to be exemplary in nature. While the full state table does not physically exist, at least in the form shown, in the invention and FIG. 1 can also be used in facilitating an understanding of the operation of known software parsers, no portion of FIG. 1 is admitted to be prior art in regard to the present invention.

It should be noted that an XML™ document is used herein as an example of one type of logical data sequence which can be processed using an accelerator in accordance with the invention. Other logical data sequences can also be constructed from network data packet contents such as user terminal command strings intended for execution by shared server computers. Such command strings are frequently generated by malicious users and sent to shatred server computers as part of a longer term intrusion attempt. The accelerator in accordance with the invention is suitable for processing many such logical data sequences.

It will also be helpful observe that many entries in the portion of the state table illustrated in FIG. 1 are duplicative and it is important to an appreciation of the invention that hardware to accommodate the entirety of the state table represented by FIG. 1 is not required. Conversely, while the invention can be implemented in software, possibly using a dedicated processor, that the hardware requirements in accordance with the invention are sufficiently limited that the penalty in increased processing time for parsing by software is not justified by any possible economy in hardware.

It should be appreciated, however, that the intrusion detection system is intended to be applicable to any type of digital file and is not limited to text files or particular languages which may be used to represent particular applications or data structures at or exceeding packet transmission speeds which can accommodate real-time digital transmissions over networks through which security attacks are generally perpetrated. Thus, the invention may be implemented as an arrangement for providing only intrusion detection; in which case substantially optimum performance at lowest cost would be expected. However, the goal of performing intrusion detection at signal transmission speeds can also be achieved as a special mode of operation of a parser accelerator in which some operations are omitted to provide further acceleration, possibly augmented by alternative state table memory arrangements as will be described below and which is presently considered to be preferred. Therefore, the invention will be described in the context of a parser accelerator in the interest of completeness and to convey a more thorough understanding of the scope of advantages provided by the invention even though that context is more complex than necessary for the invention to function as intended for real-time, high-speed intrusion detection.

In FIG. 1 the state table is divided into an arbitrary number of rows, each having a base address corresponding to a state. The rows of the base address are divided into a number of columns corresponding to the number of codes which may be used to represent characters in the document to be parsed; in this example, two hundred fifty-six (256) columns corresponding to a basic eight bit byte for a character which is used as an index into the state table.

It will be helpful to note several aspects of the state table entries shown, particularly in conveying an understanding of how even the small portion of the exemplary state table illustrated in FIG. 1 supports the detection of many words:

1. In the state table shown, only two entries in the row for state 0 include an entry other than "stay in state 0" which maintains the initial state when the character being tested does not match the initial character of any string of interest. The single entry which provides for progress to state 1 corresponds to a special case where all strings of interest begin with the same character. Any other character that would provide progress to another state would generally but not necessary progress to a state other than state 1 but a further reference to the same state that could be reached through another character may be useful to, for example, detect nested strings. The inclusion of a command (e.g. "special interrupt") with "stay in state 0" illustrated at {state 0, FD} would be used to detect and operate on special single characters.

2. In states above state 0, an entry of "stay in state n" provides for the state to be maintained through potentially long runs of one or more characters such as might be encountered, for example, in numerical arguments of commands, as is commonly encountered. The invention provides special handling of this type of character string to provide enhanced acceleration, as will be discussed in detail below.

3. In states above state 0, an entry of "go to state 0" signifies detection of a character which distinguishes the string from any string of interest, regardless of how many matching characters have previously been detected and returns the parsing process to the initial/default state to begin searching for another string of interest. (For this reason, the "go to state 0" entry will generally be, by far, the most frequent or numerous entry in the state table.) Returning to state 0 may require the parsing operation to return to a character in the document subsequent to the character which began the string being followed at the time the distinguishing character was detected.

4. An entry including a command with "go to state 0 indicates completion of detection of a complete string of interest. In general, the command will be to store a token (with an address and length of the token) which thereafter allows the string to be treated as an object. However, a command with "go to state n" provides for launching of an operation at an intermediate point while continuing to follow a string which could potentially match a string of interest.

5. To avoid ambiguity at any point where the search branches between two strings of interest (e.g. strings having n−1 identical initial characters but different n-th characters, or different initial characters), it is generally necessary to proceed to different (e.g. non-consecutive) states, as illustrated at {state 1, 01} and {state 1, FD}. Complete identification of a string of arbitrary length n will require n−1 states except for the special circumstances of included strings of special characters and strings of interest which have common initial characters. For these reason, the number of states and rows of the state table must usually be extremely large, even for relatively modest numbers of strings of interest.

7. Conversely to the previous paragraph, most states can be fully characterized by one or two unique entries and a default "go to state 0". This feature of the state table of FIG. 1 is exploited in the invention to produce a high degree of hardware economy and substantial acceleration of the parsing process for the general case of strings of interest.

As alluded to above, in the parsing operation, as conventionally performed, begins with the system in a given default/initial state, depicted in FIG. 1 as state 0, and then progresses to higher numbered states as matching characters are found upon repetitions of the process. When a string of interest has been completely identified or when a special operation is specified at an intermediate location in a string which is potentially a match, the operation such as storing a token or issuing an interrupt is performed. At each repetition for each character of the document, however, the character must be fetched from CPU memory, the state table entry must be fetched (again from CPU memory) and various pointers (e.g. to a character of the document and base address in the state table) and registers (e.g. to the initial matched character address and an accumulated length of the string) must be updated in sequential operations. Therefore, it can be readily appreciated that the parsing operation can consume large amounts of processing time.

A high-level schematic block diagram of the parser accelerator 100 in accordance with the invention is illustrated in FIG. 2A. As will be appreciated by those skilled in the art, FIG. 2A can also be understood as a flow diagram illustrating the steps performed in accordance with the invention to perform parsing. As will be discussed in greater detail below in connection with FIGS. 3, 4A, 4B, 5A and 6, the invention exploits some hardware economies in representing the state table such that a plurality of hardware pipelines are developed which operate essentially in parallel although slightly skewed in time. Thus, the updating of pointers and registers can be performed substantially in parallel and concurrently with other operations while the time required for memory accesses is much reduced through both faster access hardware operated in parallel and prefetching from CPU memory in regard to the state table and the document.

As a general overview, the document such as an XML™ document is stored externally in DRAM 120 which is indexed by registers 112, 114 and transferred by, preferably, thirty-two bit words to and input buffer 130 which serves as a multiplexer for the pipelines. Each pipeline includes a copy of a character palette 140, state table 160 and a next state palette 170; each accommodating a compressed form of part of the state table. The output of the next state palette 170 contains both the next state address portion of the address into entries in the state table 160 and the token value to be stored, if any. Operations in the character palette 140 and the next state palette 170 are simple memory accesses into high speed internal SRAM which may be performed in parallel with each other as well as in parallel with simple memory accesses into the high speed external DRAM forming the state table 160 (which may also be implemented as a cache). Therefore, only a relatively few clock cycles of the CPU initially controlling these hardware elements (but which, once started, can function autonomously with only occasional CPU memory operation calls to refresh the document data and to store tokens) are required for an evaluation of each character in the document. The basic acceleration gain is the reduction of the sum of all memory operation durations per character in the CPU plus the CPU overhead to the duration of a single autonomously performed memory operation in high-speed SRAM or DRAM.

It should be understood that memory structures referred to herein as "external" is intended to connote a configuration of memories 120, 140, which is preferred by the inventors at the present time in view of the amount of storage required and access from the hardware parser accelerator and/or the host CPU. In other words, it may be advantageous for handling of tokens and some other operations to provide an architecture of the parser accelerator in accordance with the invention to facilitate sharing of the memory or at least access to the memory by the host CPU as well as the hardware accelerator. No other connotation intended and a wide variety of hardware alternatives such as synchronous DRAM (SDRAM) will be recognized as suitable by those skilled in the art in view of this discussion.

Referring now to FIGS. 3–6, the formats of the character palette 140, the state table 160, next state palette 170 and next state and token will be discussed as exemplary of the hardware economies which support the preferred implementation of FIG. 2A. Other techniques/formats can be employed, as well, and the illustrated formats should be understood as exemplary although currently preferred.

Figure 2B:
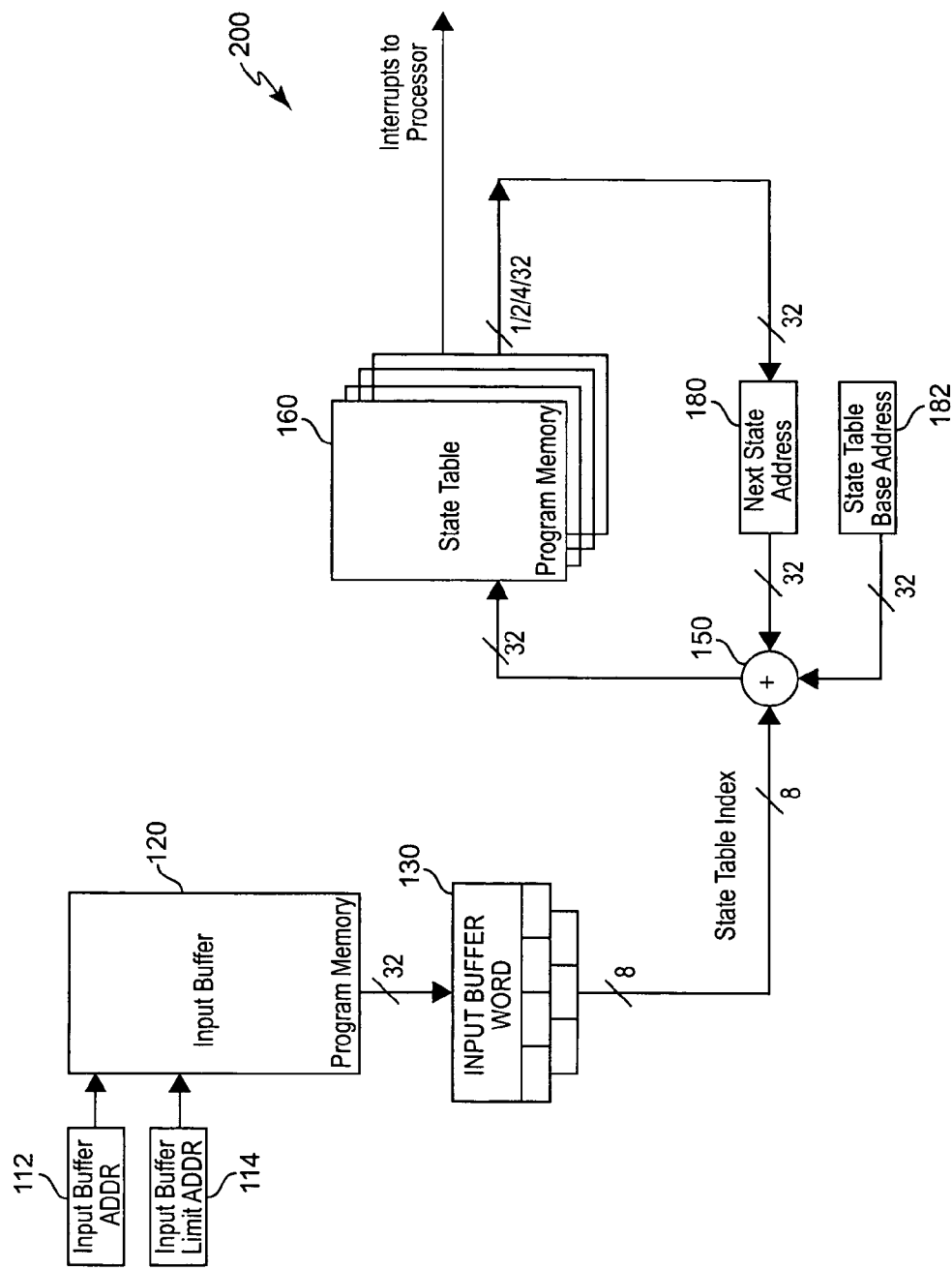
FIG. 2B is a high-level schematic diagram of the parser accelerator in accordance with the present invention.
Figure 2C:
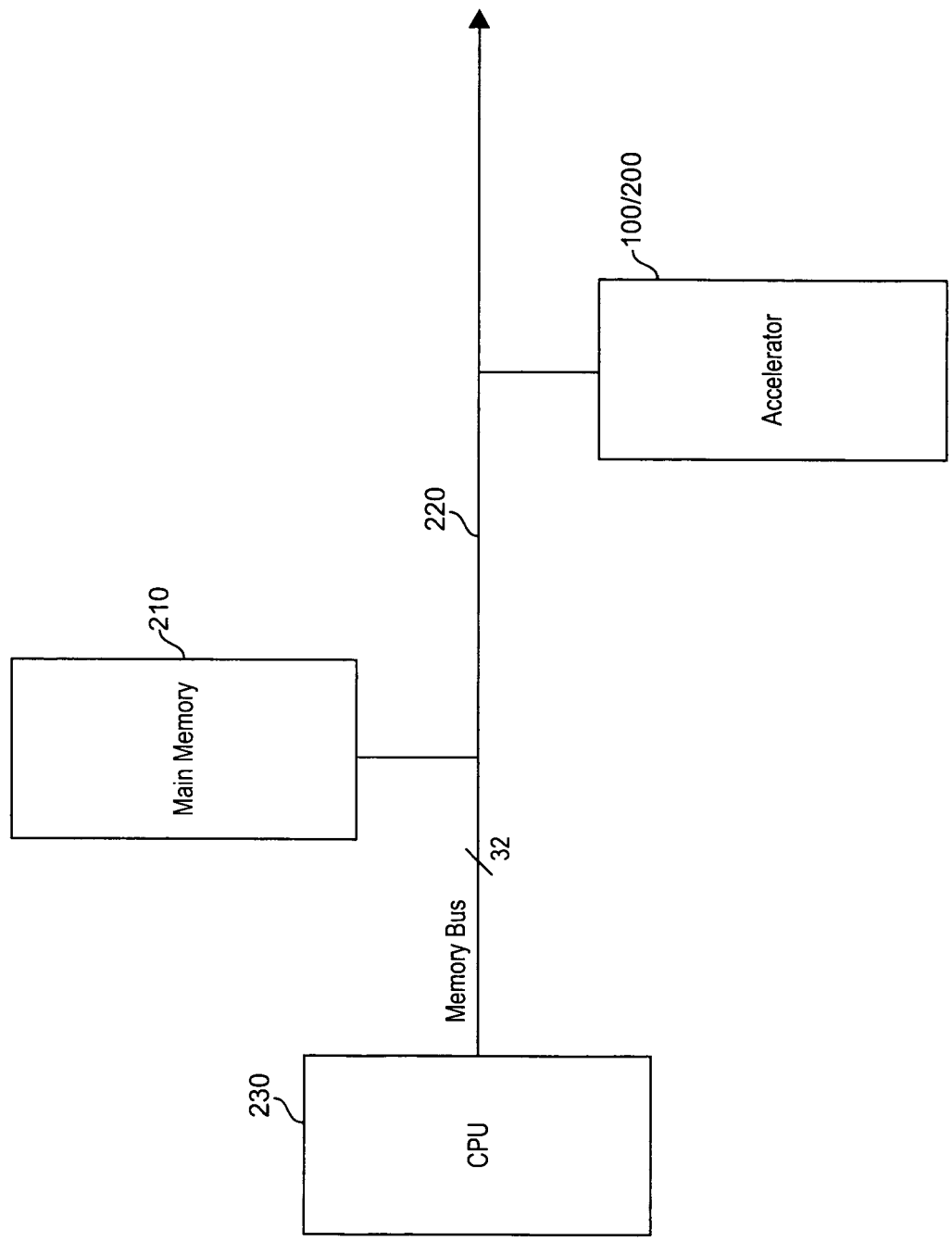
FIG. 2C illustrates an implementation of the invention with a host processor and main memory.
Figure 3:
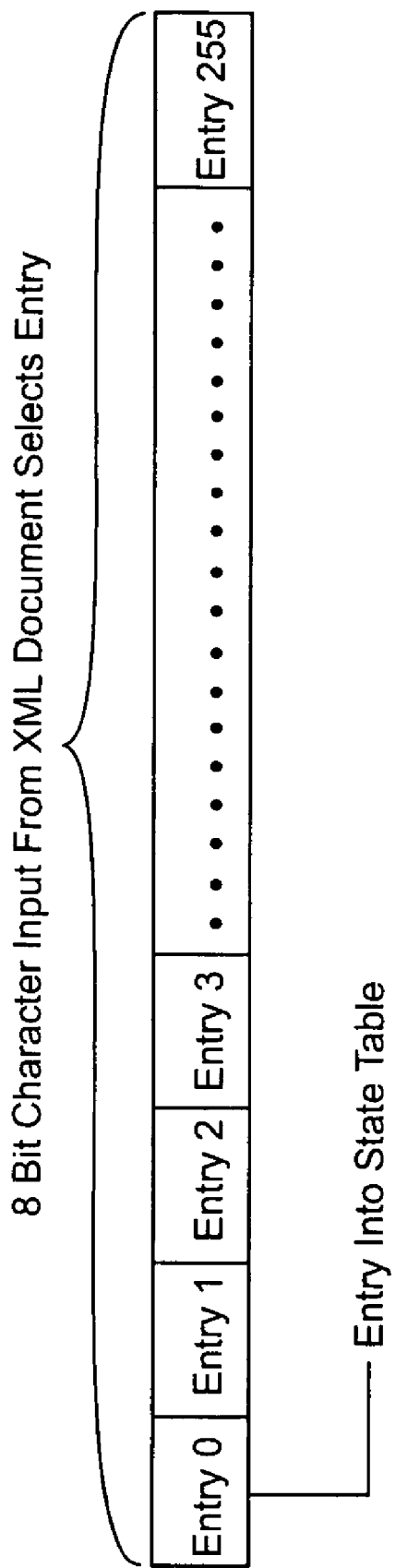
FIG. 3 illustrates a preferred character palette format as depicted in FIG. 2A, FIGS. 4A and 4B illustrate a state table format and a state table control register used in conjunction therewith in a preferred form of the invention as depicted in FIG. 2A.

FIG. 3 illustrates the preferred form of a character palette which corresponds to the characters which are or may be included in the strings of interest. This format preferably provides entries numbered 0–255, corresponding to the number of columns in the state table of FIG. 1. (The term "palette" is used in much the same sense as in the term "color palette" containing data for each color supported and collectively referred to as a gamut. Use of a pallette reduces entries/columns in the state table.) For example, a character referred to as a "null character" which does not result in a change of state can be expressed in one column of the state table rather than many such columns. It is desirable to test for a null character output at 144 which can substantially accelerate processing for parsing since it allows immediate processing of the next character without a further memory operation for state table access. The format can be accommodated by a single register or memory locations configured as such by, for example, data in base address register 142 which points to a particular character palette (schematically illustrated by overlapping memory planes in FIG. 2). The current eight bit character from the document (e.g. XML™ document), one of four provided from the input buffer 130 as received as a four byte word from the external DRAM 120, addresses an entry in the character palette which then outputs an address as an index or partial pointer into the state memory. Thus by providing a palette in such a format a portion of the functionality of FIG. 1 can be provided in the form of a single register of relatively limited capacity; thus allowing a plurality thereof to be formed and operated in parallel while maintaining substantial hardware economy and supporting others in the state table 160.

Figure 4A:
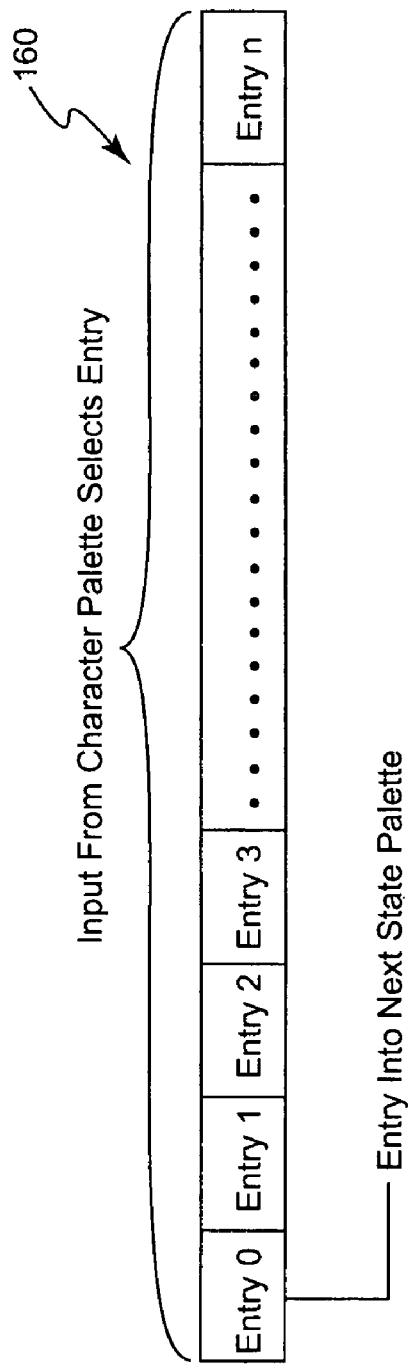

FIG. 4A shows the preferred state table format which is constituted or configured similarly to the character palette (e.g. substantially as a register). The principal difference from the character palette of FIG. 3 is that the length of the register is dependent on the number of responses to characters desired and the number and length of strings of interest. Therefore, it is considered desirable to provide for the possibility of implementing this memory in CPU or other external DRAM (possibly with an internal or external cache) if the amount of internal memory which can be economically provided is insufficient in particular instances. Nevertheless, it is clear that a substantial hardware economy is provided since highly duplicative entries in the state table of FIG. 1 can be reduced to a single entry; the address of which is accommodated by the data provided as described above in accordance with the character palette of FIG. 3. The output of the state table 160 is preferably one, two or four bits but provision for as much as thirty-two bits may provide increased flexibility, as will be discussed below in connection with FIG. 4B. In any case, the output of the state table provides an address or pointer into the next state palette 170.

Figure 4B:
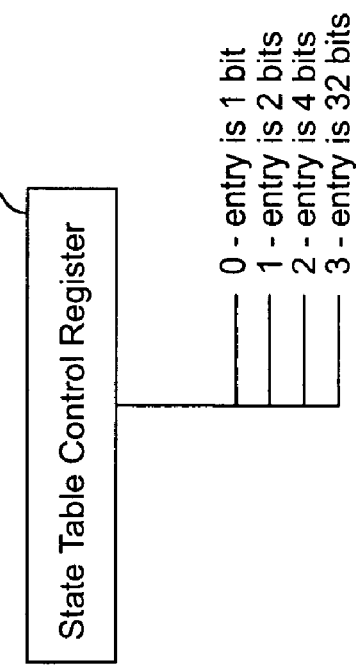

Referring now to FIG. 4B, as a perfecting feature of the invention in this latter regard, a preferred implementation feature of the invention includes a state table control register 162 which allows a further substantial hardware economy, particularly if a thirty-two bit output of state table 160 is to be provided. Essentially, the state table control register provides for compression of the state table information by allowing a variable length word to be stored in and read out of the state table.

More specifically, the state table control register 162 stores and provides the length of each entry in the state table 160 of FIG. 4A. Since some state table entries in FIG. 1 are highly duplicative (e.g. "go to state 0", "stay in state n"), these entries not only can be represented by a single entry in state table 160 or at least much fewer than in FIG. 1 but may also be represented by fewer bits, possibly as few as one which will yield substantial hardware economies even if most or all duplicative entries are included in the state table, as may be found convenient in some state tables. The principle of this reduction will be recognized by those skilled in the art as similar to so-called entropy coding.

Figure 5A:
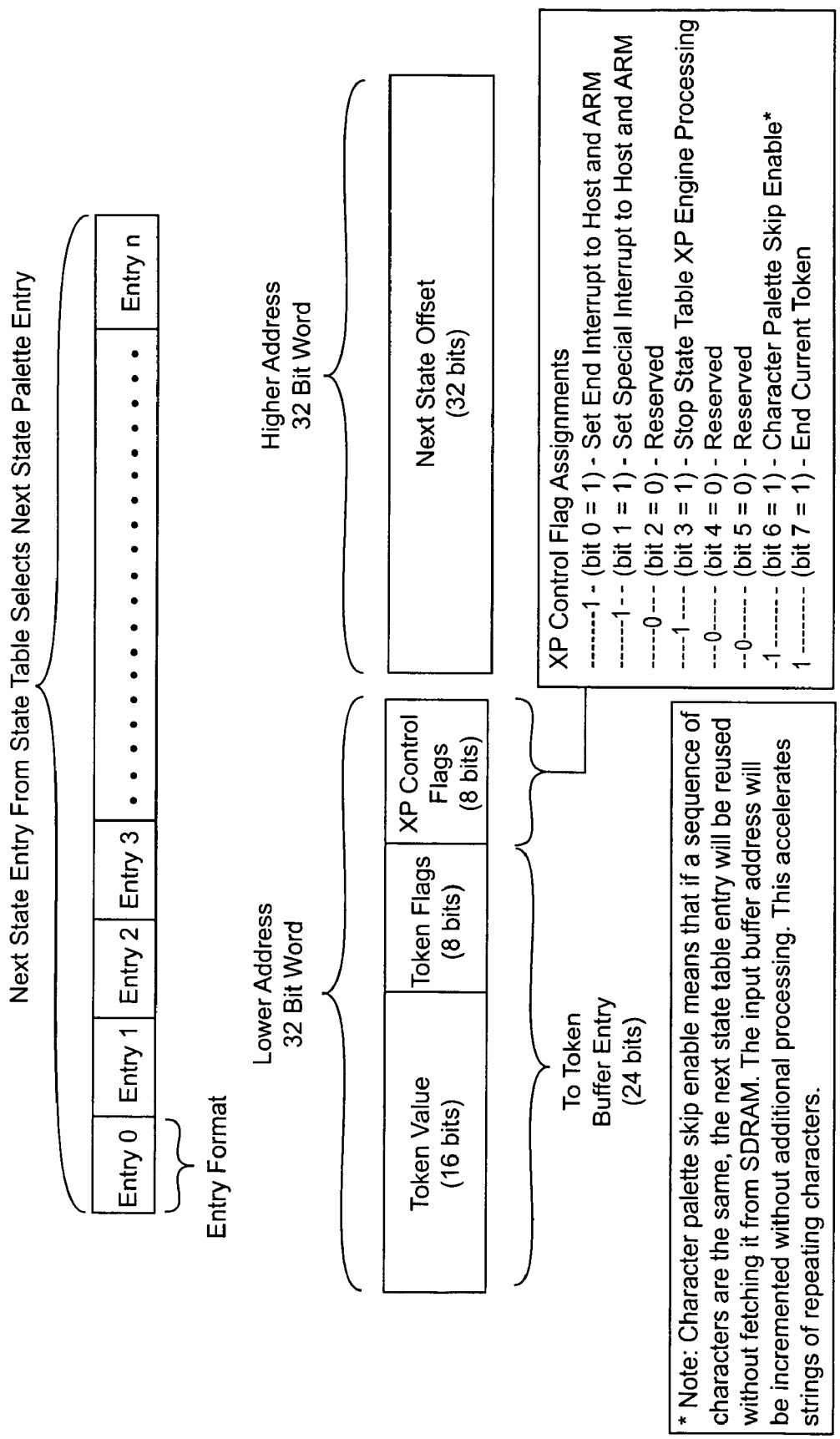
FIG. 5A illustrates a preferred next state palette format as depicted in FIG. 2A.

Referring now to FIG. 5A, the preferred format of the next state palette 170 will now be discussed. The next state pallette 170 is preferably implemented in much the same manner as the character palette 140 discussed above. However, as with the state memory 160, the number of entries that may be required is not, a priori, known and the length of individual entries is preferably much longer (e.g. two thirty-two bit words). On the other hand, the next state palette 170 can be operated as a cache (e.g. using next state palette base address register 172) since only relatively small and predictable ranges of addresses need be contained at any given time. Further, if thirty-two bit outputs of the state table 160 is provided, some of that data can be used to supplement the data in entries of the next state palette 170, possibly allowing shorter entries in the latter or possibly bypassing the next state pallette altogether, as indicated by dashed line 175.

As shown in FIG. 5A, the lower address thirty-two bit word output from the next palette 170 is the token to be saved. A token buffer 190 is coupled to the next state palette 170. A current token pointer 192, a current token length register 194, and a token buffer current address register 196 are each coupled to the token buffer 190. The token preferably is formed as a token value of sixteen bits, eight bits of token flags, both of which are stored in the token buffer 190 at an address provided by the current token pointer 192 to the beginning of the string and together with the length accumulated by counting successful character comparisons, and eight bits of control flags. The control flags set interrupts to the host CPU or control processing in the parser accelerator. One of these latter control flags is preferably used to set a skip enable function for characters which do not cause a change of state at a state other than state 0 such as a string of the same or related characters of arbitrary length which may occur in a string of interest, as alluded to above. In such a case, the next state table entry can be reused without fetching it from SRAM/SDRAM. The input buffer address 112 is incremented without additional processing; allowing substantial addition acceleration of parsing for certain strings of characters. The second thirty-two bit word is an address offset fed back to register 180 and adder 150 to be concatenated with the index output from the character palette to form a pointer into the state table for the next character. The initial address corresponding to state 0 is supplied by register 182.

Thus, it is seen that the use of a character palette, a state memory in an abbreviated form and a next state memory articulate the function of the conventional state memory operations into separate stages; each of which can be performed extremely rapidly with relatively little high speed memory which can thus be duplicated to form parallel pipelines operating on respective characters of a document in turn and in parallel with other operations and storage of tokens. Therefore, the parsing process can be greatly accelerated relative to even a dedicated processor which must perform all of these functions in sequence before processing of another character can be started.

In summary, the accelerator has access to the program memory of the host CPU where the character data (sometimes referred to as packet data connoting transmission of a network) and state table are located. The accelerator 100 is under control of the main CPU via memory-mapped registers. The accelerator can interrupt the main CPU to indicate exceptions, alarms and terminations, which, in the context of intrusion detection may be referred to generically as a pattern matching alert. an intrusion event alert or the like. When parsing is to be started, pointers (112, 114) are set to the beginning and end of the input buffer 130 data to be analyzed, the state table to be used (as indicated by base address 182 and other control information (e.g. 142) is set up within the accelerator.

To initiate operation of the accelerator, the CPU issues a command to the accelerator which, in response, fetches a first thirty-two bit word of data from the CPU program memory (e.g. 120 or a cache) and places it into the input buffer 130 from which the first byte/ASCII character is selected. The accelerator fetches the state information corresponding to the input character (i.e. FIG. 4A corresponds to a single character or a single column of the full state table of FIG. 1) and the current state. The state information includes the next state address and any special actions to be performed such as interrupting the CPU or terminating the processing.

The accelerator next selects the next byte to be analyzed from input buffer 130 and repeats the process with the new state information which will already be available to adder 150. The operation or token information storage can be performed concurrently. This continues until all four characters of the input word have been analyzed. Then (or concurrently with the analysis of the fourth character by prefetching) buffers 112, 114 are compared to determine if the end of the document buffer 120 is reached and, if so, an interrupt is sent back to the CPU. If not, a new word is fetched, the buffer 112 is updated and the processing is repeated.

Since the pointers and counters are implemented in dedicated hardware they can be updated in parallel rather than serially as would be required if implemented in software. This reduces the time to analyze a byte of data to the time required to fetch the character from a local input buffer, generate the state table address from high speed local character palette memory, fetch the corresponding state table entry from memory and to fetch the next state information, again from local high speed memory. Some of these operations can be performed concurrently in separate parallel pipelines and other operations specified in the state table information (partially or entirely provided through the next state palette) may be carried out while analysis of further characters continues.

Thus, it is clearly seen that the invention provides substantial acceleration of the parsing process through a small and economical amount of dedicated hardware. While the parser accelerator can interrupt the CPU, the processing operation is entirely removed therefrom after the initial command to the parser accelerator. However, since substantial time is required for processing of tokens even when performed concurrently with other parsing operations, the acceleration provided as described above is not optimal for detection of a possible intrusion or security breach, particularly in view of the fact that operations which are difficult or impossible to secure can be initiated by the issuance of commands in the course of the parsing process.

Referring now to FIG. 2B, an arrangement is shown for a hardware parsing accelerator which greatly enhances processing speed of parsing beyond that of the arrangement of FIG. 2A as described above but for the limited purpose of detection of a signature of a possible intrusion or security breach but which is fully compatible therewith. By comparing FIG. 2B with FIG. 2A it will be recognized by those skilled in the art that the arrangement of FIG. 2B is principally a sub-set of the arrangement of FIG. 2A and provides the same advantage of being able to search for all strings which may be a signature of an intrusion (e.g. a match to one or more expressions or portions thereof whereby a pattern matching alert can be issued to the CPU prior to matching a complete expression encoded in the state table; thus increasing response speed) simultaneously but provides further acceleration through omission of token processing since only the issuance of an interrupt or exception to protect the system need be issued as a result of the processing. The processing as described above for full parsing of the document can be performed after the document is screened for the inclusion of a possible security breach signature is completed. Since token processing is omitted during this screening process, memory accesses are much reduced in number. That is, for the intrusion detection accelerator in accordance with the invention (and in comparison with the hardware parser accelerator described above), the token processing, and the use of a character palette are omitted, resulting in lower memory resource requirements and some reduction in processing time. However, since much of this processing is done in parallel, the increase of processing speed is generally about 25% or somewhat less; depending, in part, on the particular devices used for the various resources in terms of memory speed, logic speed and the like. perhaps more importantly than speed, however, is the fact that any signature of a possible security breach will be detected and a remedial interrupt or exception issued before a corresponding command can be executed by the CPU as part of the attack.

All functional elements of the arrangement of FIG. 2B are present in FIG. 2A and the same reference numerals are used for corresponding elements. Therefore it is evident that the intrusion detection parser accelerator 200 in accordance with the invention is entirely compatible with the parser accelerator described above and the change of the arrangement can be largely accomplished through programming such that the intrusion detection processing is essentially a special mode of operation of the parser accelerator of FIG. 2A.

Specifically, the input buffer 120 and the input word buffer 130, together with the address registers 112, 114, adder 150 and state table base address register 182 are identical to the corresponding elements described above and function in an identical manner to access state table 160. The difference resides principally in the omission of the character palette and the next state pallette memories and the data in the state table and internal format thereof. The state table is essentially of the same width, 256 characters as in the embodiment of FIG. 2A. It should be understood that the signatures for which the search is conducted may be more complex than a simple character string of an arbitrary number of characters. The signatures are more generally described as "regular expressions" which may be more complex than character strings, as discussed in "So What's a $#!%% Regular Expression Anyway?!" by Vikram Vaswani et al. (Developer Shed), Copyright Melonfire 2000–2002, which is hereby fully incorporated by reference. The state table corresponding to a regular expression can thus be much larger than for a simple character string. Additionally, multiple regular expressions can be searched for concurrently using the same state table which could lead to very large state tables. However, in practice, sixty-four states are generally sufficient. If not, however, expansion of the state table entry to beyond eight bits would be necessary. Therefore, the extreme compression provided as described above is not generally necessary and the hardware of the state table 160 as described above can provide a substantial portion is not the entirety of the state table required for detection of attack signatures in order to reduce the number of memory accesses required.

Figure 5B:
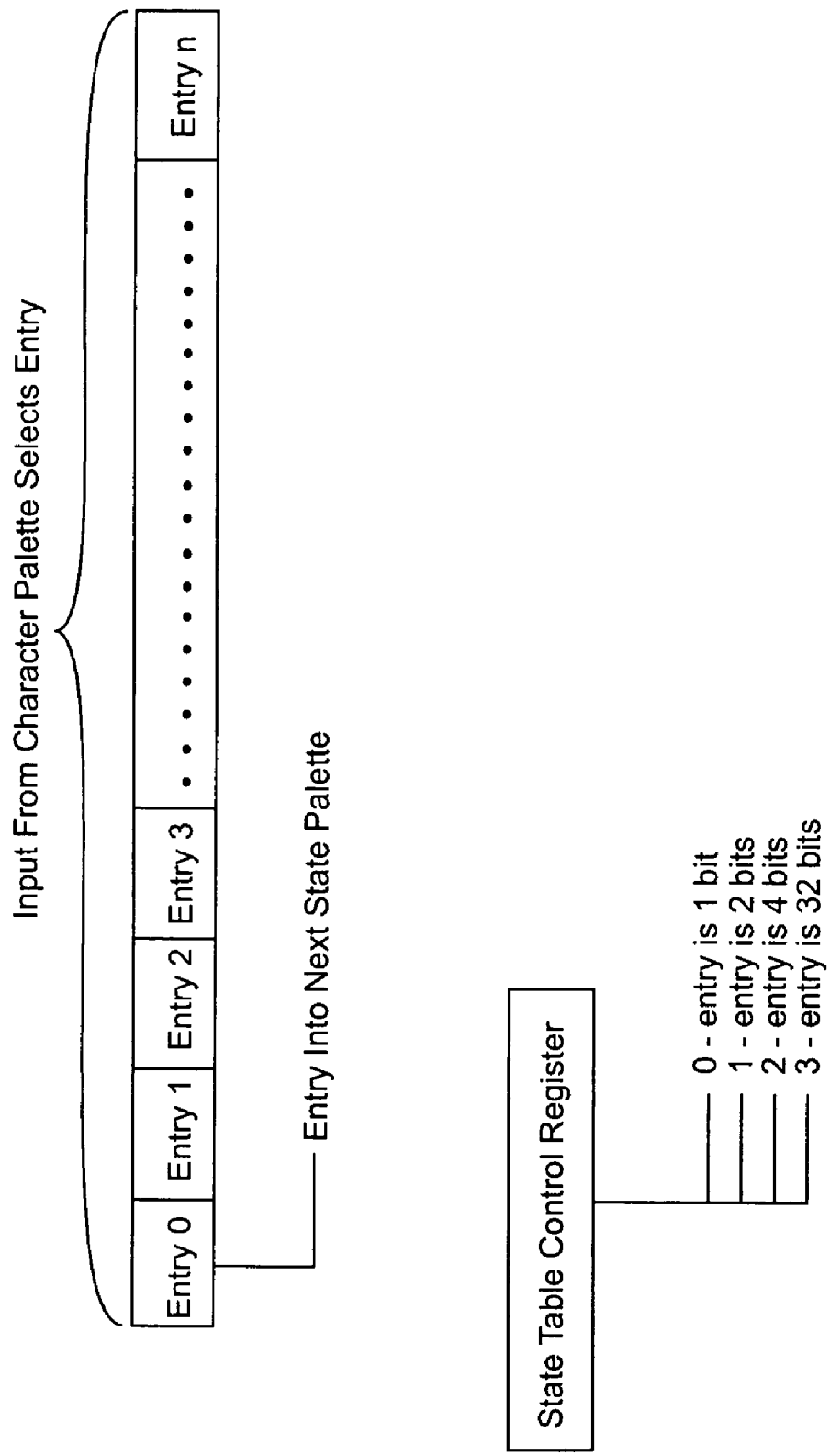
FIG. 5B illustrates a preferred state table entry format for use with the invention as depicted in FIG. 2B.
Figure 6:
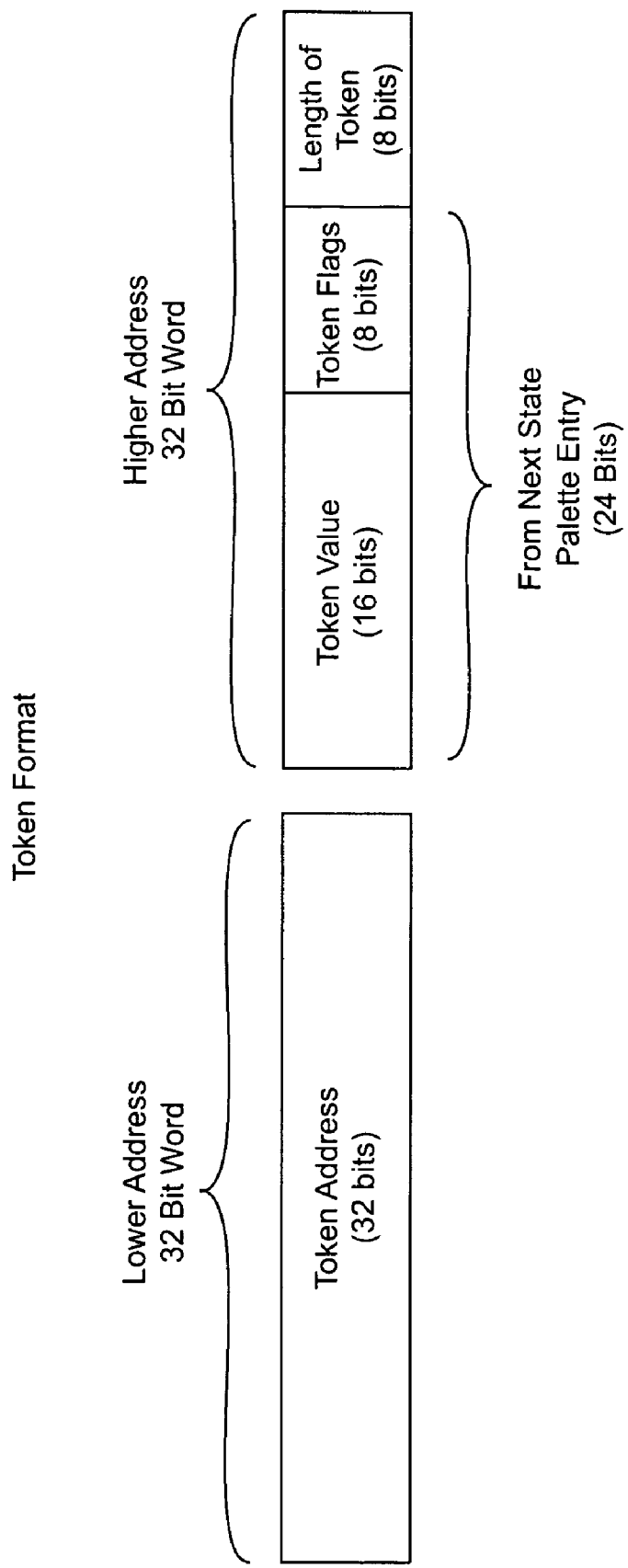
FIG. 6 is a preferred token format as depicted in FIG. 5.

As in the embodiment of FIG. 2A, the format of the data in the state table preferably includes n=256 entries to accommodate the number of characters which can be expressed by a byte. In the case of the embodiment of FIG. 2B, however, access into the state table is performed directly from the character bits buffered in word buffer 130. The contents of respective entries in the state table need only comprise a next state or row of the state table to be loaded, which defines character strings of interest and allows character strings to be followed, and/or a flag or other code for the interrupt or exception that is to be issued for the character of a string which supports recognition of the string as a signature (which is not necessarily the last character of a string which may constitute such a signature), as illustrated in FIG. 5B. The next state can usually be expressed in less that eight bits and the interrupt of exception to be produced upon detection of a string of interest may be expressed as a single bit.

Thus, the characters are tested in sequence and no updating of any registers other than registers 112, 114 is required until a character is encountered which is the first character of a string of interest. That is, until such a detection, even the state is unchanged and the next state is not updated in register 180. Therefore, the document can be screened for initial characters with extreme speed. When an initial character of a string of interest is encountered the next state data is read from the state table, register 180 is updated, new state table data is loaded into the state memory if not already present and the next character is processed in the same manner. The state table memory is much smaller than for the XML™ parser described above. This allows for the state table memory to be implemented on board the chip with other logic and elements of FIG. 2A or 2B; decreasing the processing cycle time to possibly as little as 25% of the time required for a design using external memory. However, if the accelerator is designed as simply a special mode of operation of the XML™ parser, the state table would be implemented in external memory and such a speed-up would not be provided. Therefore, it may be cost-effective in such a case to provide both on board and external memories to be used alternatively depending on state table size. Thus, only a relatively few clock cycles are required for each character to screen a document for attack signatures. When a sufficient number of characters have been processed to identify a string of interest, the data read from the state table will include an interrupt or an exception that is issued to the host CPU as a command for protection of the system.

While the architecture of the system including the invention as embodied as shown in either FIG. 2A or 2B is not critical to the practice of the invention, the architecture shown in FIG. 2C is preferred in connection with the intusion detection accelerator of FIG. 2B. Specifically, the host CPU 230 and its main memory 210 are connected by a bus 220 through which the hardware parser accelerator of the invention communicates with the main memory 210 and the host CPU 230. While the CPU 230 could monitor communications between main memory 210 and accelerator 100/200 the tokens have not yet been defined or established and execution of code for performing an attack is not possible. Therefore, the invention provides for issuance of a remedial interrupt or exception before performance of any operations which may be included in an attack.

In view of the foregoing, it is seen that the invention provides for extremely rapid screening of a document for signatures which may indicate the possibility of an attempted attack within the context and environment of a hardware parser accelerator which significantly reduces time for parsing of a document such as an XML™ document to a fraction of the time which has been required prior to the present invention. The intrusion detection parser of the present invention requires no additional elements or hardware beyond that of the parser accelerator in accordance with the invention and can issue interrupts and/or exceptions prior to any intrusion process becoming executable.

While the invention has been described in terms of a single preferred embodiment, those skilled in the art will recognize that the invention can be practiced with modification within the spirit and scope of the appended claims.

The invention claimed is:

1. An intrusion detection system comprising:
a character buffer to store a plurality of bytes of a document;
a state table addressable in accordance with a byte of the document and a state to access at least one of an interrupt, an exception, or a command to store a token and next state data from said state table, wherein the command to store the token is accessed when a state in the state table is reached that indicates a valid token has been parsed;
a register to store said next state data;
means for combining contents of said register with a subsequent byte of the document to form a further address into said state table;
a token buffer to store a plurality of tokens, wherein said plurality of tokens are available for further processing by a host processor; and
a bus to communicate said interrupt or said exception to said host processor,
wherein the intrusion detection system simultaneously performs a function of accessing said state table, storing said token, and combining said stored next state data with a second portion of said document in parallel.

2. The intrusion detection system as recited in claim 1, wherein said intrusion detection system is implemented within a parser.

3. The intrusion detection system as recited in claim 2, wherein said state table is implemented in an external memory.

4. The intrusion detection system as recited in claim 3, further including a memory on the same chip as at least one of said register and said means for combining for storing said state table when said state table does not require implementation in said external memory.

5. The intrusion detection system as recited in claim 1, wherein said state table is implemented in memory on the same chip as at least one of said register and said means for combining.

6. The intrusion detection system as recited in claim 1, wherein said state table is accessed at a rate greater than a network packet transmission rate.

7. The intrusion detection system as recited in claim 1, further including means for presenting a pattern matching alert to be presented to said host processor in response to detection of an occurrence of an input sequence which matches a signature of one or more sequences encoded in said state table, to increase response speed.

8. The intrusion detection system as recited in claim 7, wherein an intrusion alert corresponding to said interrupt or said exception is communicated to said host processor to initiate an intrusion prevention action to prevent or limit an intrusion attempt.

9. The intrusion detection system as recited in claim 1, wherein said state table is accessed at a rate substantially equal to a network data packet transmission rate.

10. An intrusion detection method comprising:
accessing a state table addressable in accordance with a byte of a document and a current state;
retrieving at least one of an interrupt or an exception from said state table, if said interrupt or said exception is available;
retrieving a token-storing command from said state table in response to determining that no interrupt or exception is available and that a valid token has been parsed;
storing a token in a token buffer in response to said token-storing command;
retrieving next state data from said state table;
storing said next state data;
combining said stored next state data with a subsequent byte of said document to form a further address into said state table; and
simultaneously performing the accessing said state table, storing said token, and combining said stored next state data with a second portion of said document in parallel.

11. The intrusion detection method as recited in claim 10, wherein said intrusion detection method is implemented within a parser.

12. The intrusion detection method as recited in claim 11, wherein said state table is implemented in an external memory.

13. The intrusion detection method as recited in claim 10, wherein said state table is accessed at a rate greater than a network packet transmission rate.

14. The intrusion detection method as recited in claim 10, further comprising:
presenting a pattern matching alert to be presented to said host processor in response to detection of an occurrence of an input sequence, which matches a signature of one or more sequences encoded in said state table, to increase response speed.

15. The intrusion detection method as recited in claim 14, wherein an intrusion alert corresponding to said interrupt or said exception is communicated to said host processor to initiate an intrusion prevention action to prevent or limit an intrusion attempt.

16. The intrusion detection method as recited in claim 10, wherein said state table is accessed at a rate substantially equal to a network data packet transmission rate.

17. A computer program product for enabling a computer to accelerate the detection of intrusions comprising:
software instructions for enabling the computer to perform predetermined operations; and
a computer readable medium bearing the software instructions;
the predetermined operations including:
accessing a state table addressable in accordance with a byte of a document and a previous state;
retrieving at least one of an interrupt or an exception from said state table, if said interrupt or said exception is available;
retrieving a command to store a token from said state table, if said command is available and said token has been fully parsed, and storing said token in response to said command to store said token;
retrieving next state data from said state table;
storing said next state data;
combining said stored next state data with a subsequent byte of said document to form a further address into said state table;
making said token available for subsequent processing for a different purpose after said token has been parsed and stored; and
simultaneously performing the accessing said table, storing said token, and combining said stored next state data with a second portion of said document in parallel.

18. The computer program product of claim 17, wherein said different purpose is a contextual analysis to detect an intrusion at a document level.

19. The computer program product of claim 17, wherein said different purpose is an end use of the document.

20. The computer program product as recited in claim 17, wherein said different purpose is unrelated to intrusion detection.

21. An intrusion detection system comprising:
means for accessing a state table addressable in accordance with a first portion of a document and a current state;
means for retrieving at least one of an interrupt or an exception from said state table, if said interrupt or said exception is available;
means for retrieving a command from said state table, if said command is available, and storing a token in response to a command to store a token;
means for retrieving next state data from said state table;
means for storing said next state data;
means for combining said stored next state data with a second portion of said document to form a further address into said state table;
means for simultaneously performing the functions of accessing said state table, storing said token, and combining said stored next state data with said second portion of said document in parallel; and
means for communicating said interrupt or said exception to a host processor.

22. The intrusion detection system of claim 21, wherein said intrusion detection system is implemented within a parser.

23. The intrusion detection system of claim 21, further including means for presenting a pattern matching alert to be presented to said host processor in response to detection of an occurrence of an input sequence which matches a signature of one or more sequences encoded in said state table to increase response speed.

24. The intrusion detection system of claim 21, wherein an intrusion alert corresponding to said interrupt or exception is communicated to said host processor to initiate an intrusion prevention action to prevent or limit an intrusion attempt.

25. The intrusion detection system of claim 21, wherein said first portion and said second portion represent a character.

* * * * *